United States Patent Office 3,320,231
Patented May 16, 1967

3,320,231
REACTIVE MONOAZO DYESTUFFS CONTAINING A NAPHTHYLTRIAZOLYL GROUP
Jurg Ammann, Basel, and Werner Bossard, Riehen, Switzerland, assignors to J. R. Geigy A.-G., Basel, Switzerland
No Drawing. Filed Oct. 22, 1963, Ser. No. 318,096
Claims priority, application Switzerland, Oct. 25, 1962, 12,537/62
11 Claims. (Cl. 260—153)

The present invention concerns new reactive metal-free monazo dyestuffs, processes for the production thereof, their use for the dyeing of cellulose and polyamide material as well as, industrial products, the materials dyed therewith.

It is an object of the present invention to provide reactive dyes for the dyeing of cellulosic materials and in particular of cotton, which afford dyeings of especially good fastness to chlorine and to light, apart from the good wet fastness properties possessed by reactive cotton dyes, and which are distinguished by brilliant shades.

It is a further object of the invention to provide reactive dyes of the aforesaid properties which are sufficiently substantive to permit dyeing of cellulosic materials from a long bath (goods-to-liquor ratios above 1:5) and the non-fixed portion of which remaining on the fibers after dyeing and fixing can be easily removed by washing.

These and other objects that will become apparent as the description of our invention proceeds, are attained in the dyestuffs of the formula

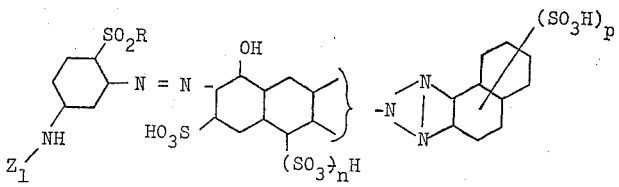

wherein $n$ is 0 or 1 and $p$ is one of the integers 0 to 3, the sum of $n+p$ ranging from 1 to 3 and being preferably 2, R is hydroxy or lower alkyl, preferably with not more than 4 carbon atoms, and $Z_1$ is a reactive dyestuff substituent containing at least one mobile halogen atom, preferably with an atomic number ranging from 9 to 35 and preferably from 17 to 35, whereby said dyestuffs are capable of reacting with cellulose. These dyestuffs have good water-solubility in the form of their alkali metal salts, are pH-stable, and dye cellulose material such as staple fiber, jute, ramie, hemp and, mainly, cotton, but also regenerated cellulose such as viscose and the like fibers in orange-red to red shades.

Cellulose material is dyed with the dyestuffs according to the invention, by the exhaustion process, by entering the cellulose to be dyed into a dyebath having a long liquor ratio and at a slightly raised temperature, which dyebath contains an acid binding agent and, optionally, also neutral salts such as e.g. sodium chloride or sulfate, gradually heating the dyebath to temperatures of 60–100° C. and completing dyeing at this temperature. The neutral salts which accelerate the drawing power of the dyestuff can also be added to the bath only after the actual dyeing temperature has been attained, if desired.

The new dyestuffs are chemically bound to the fiber by the treatment with acid binding agents and, after soaping to remove residual non-fixed dyestuff, in particular the dyeings on cotton have excellent wet fastness properties.

These dyestuffs according to the invention are distinguished by pure brilliant shades.

A particular advantage of the dyestuffs of Formula IA, which are derived from 2-amino-5-hydroxynaphthalene-7-sulfonic acid or 2-amino-8-hydroxynaphthalene-6-sulfonic acid compared with dyestuffs of similar constitution but not having the characteristic arenotri-azolyl-(2) radical, is that these dye-stuffs according to the invention have increased substantivity to cellulose and are therefore, particularly well suited for dyeing from a long bath according to the exhaustion process described above (goods-to-liquor ratios may be as low as about 1:20, to 1:80).

It is surprising, that, in spite of this increased substantivity of the dyestuffs according to the invention, unreacted portions of dyestuff not fixed to the substrate can be very easily and completely removed by washing; this being one of the most important requirements for good wet fastness properties of dyeings on cellulose produced with reactive dyestuffs.

The dyeings obtained with the dyestuffs of Formula IA are fast to light and have remarkable fastness to chlorine. Fastness to chlorine is particularly surprising, since reactive monoazo dyestuffs of the aforesaid type are often not fast to chlorine.

It is also noteworthy that the desirable good substantivity of the dyestuffs of Formula IA is not found in the isomeric dyestuffs derived from the corresponding 1-amino-5-hydroxynaphthalene-7-sulfonic acid and 1-amino-8-hydroxynaphthalene-6-sulfonic acid. These latter dyestuffs are therefore unsuited for the dyeing of cellulose materials by the desired long bath exhaustion method.

Dyestuffs similar to those of Formula IA but containing a phenyl-triazolyl instead of the naphthyltriazolyl grouping which is characteristic of the compounds according to this invention, are much more difficult to produce and hence of no commercial interest.

The reactive group $Z_1$ in the dyestuffs of Formula IA according to the invention is in m-position to the azo bridge and in p-position to the sulfonyl substituent at the benzene nucleus constituting the diazo component; isomeric dyestuffs having the reactive group in other positions, in particular in p-position to the azo bridge, afford only dyeings of inferior fastness to light and to chlorine, of less brilliant to dull colors, and are not of stable shade under fluctuations in the pH of the dyebath.

The reactive group $Z_1$ contains as mobile halogen atoms preferably chlorine or bromine, but also fluorine, the mobility of which halogen atoms is due, for example, to the bond to α- or β-carbon atoms in negatively substituted aliphatic radicals; to the $SO_2$ group in the case of fluorine; or to the presence of electrophilic substituents in o- or/and p-position in aromatic radicals or to the presence of tertiary ring nitrogen atoms in heterocycles of aromatic character, in this case preferably 6-membered heterocycles having at least two and preferably from two to three tertiary ring nitrogen atoms.

Thus $Z_1$ represents, for example, the radical of lower saturated or unsaturated aliphatic halogen-carboxylic acids such as the radical of chloroacetic acid, bromoacetic acid, β-chloro- or β-bromo- propionic acid, α- or β-chloro- or α- or β-bromo- acrylic acid, α,β-dichloro- or α,β-dibromo-acrylic acid, α- or β-chloro- or α- or β-bromo-crotonic acid, α,β-dichloro-crotonic acid, chloro- or bromo- maleic or -fumaric acid, or the radical of fluoronitro- or chloronitro-benzene carboxylic acid or of fluoronitro- or chloronitro- benzene sulfonic acid, in which the fluorine or chlorine atom is in o- or/and p-position to the nitro group or groups or the radical of 2,3-dichloro-quinoxaline-6-carboxylic acid.

Preferably, however, $Z_1$ represents a triazinyl or pyrimidyl radical containing at least one mobile halogen atom, e.g., a chlorine or bromine atom, the remaining free carbon bonds of the respective nucleous being occupied by hydrogen, halogen, lower alkoxy, lower alkylthio, phenoxy, phenylthio, —NH$_2$, —NHR' or —NR'R", wherein R' is lower alkyl, hydroxy-lower alkyl, cyano-lower alkyl, phenyl, sulfophenyl, or lower alkyl-phenyl and R" is lower alkyl, or hydroxy-lower alkyl.

In the best compounds of Formula IA, $Z_1$ represents a di- or the tri- bromo- or a di- or the tri-chloro- pyrimidine radical.

The above-described dyestuffs according to the invention as well as other structurally related dyestuffs are produced by coupling the diazonium compound of an amine of formula $$Z—A—NH_2 \quad (I)$$

wherein A represents a radical of the benzene series which may be sulfonated,

Z represents a group bound to A, optionally by way of an amino group, which group contains at least one substituent which can be split off as anion or at least one poly-linkage which is capable of addition, with a coupling component of Formula II

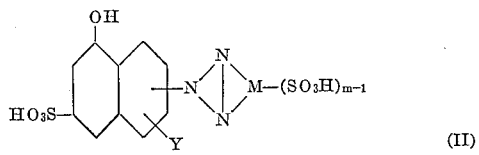

(II)

wherein:

Y represents hydrogen or the sulfonic acid group,
M represents an aromatic radical bound by two of its carbon atoms which are adjacent and
m represents a positive whole number of at most three, to form a compound of Formula III

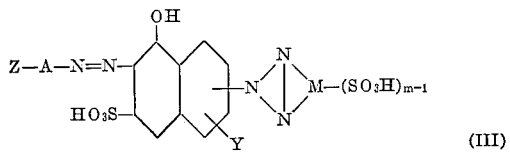

(III)

wherein A and Z have the meaning given in Formula I and Y, M and m have the meaning given in Formula II.

The triazole ring as shown is to be understood as also containing mesomeric structures.

The benzene radical A can contain the substituents usual in azo dyestuffs, for example, alkyl or alkylsulfonyl groups.

M preferably represents a homocyclic-aromatic radical, for example, a radical of the benzene, naphthalene or acenaphthalene series. M in the meaning of a polynuclear ring system is advantageously linked by α,β-carbon atoms to the nitrogen atoms; perferably M is a radical of the naphthalene series bound in α- and β- position.

The group

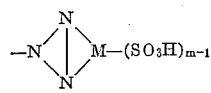

is preferably in the 6- or 7-position of the 1-hydroxy-naphthalene-3-sulfonic acid nucleus of Formulas II or III and m is preferably the number 3.

The starting materials of Formula I are known or can be obtained by methods known per se. Particularly valuable end products are obtained by using the diazonium compound of an amine of Formula IV

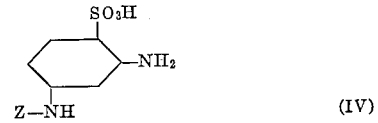

(IV)

wherein Z represents a group which contains at least one substituent which can be split off as anion or at least one poly-linkage capable of addition, and which is, in particular, a mono- or di- halogenotriazinyl or a di- or tri-halogenopyrimidyl radical, in the latter case, preferably the trichloropyrimidyl radical. Compounds of the Formula IV are obtained, for example, by condensation of 1,3-diaminobenzene-6-sulfonic acid with the desired di- or tri-halogenotriazine or tri- or tetra- halogenopyrimidine compound, halogen preferably being chlorine, but also bromine.

Coupling components of Formula II are obtained by diazotizing an amino - 1 - hydroxynaphthalene-3-sulfonic acid the amino group of which is in the position desired for the arenotriazolyl substituent coupling the diazonium compound with an optionally sulfonated aromatic amine coupling in a position adjacent to the amino group and oxidizing the o-amino-azo dyestuff obtained to form the triazole. The oxidation is preferably performed with at least the stoichiometric amount of a copper-(II) salt such as copper-(II)-sulfate or copper-(II)-chloride in a neutral to weakly acid solution at a raised temperature, or it is performed with air oxygen in the presence of a slight amount of copper-(II) salt.

The following are examples of suitable amino-1-hydroxy - naphthalene-3-sulfonic acids: 1-amino-5-hydroxy-naphthalene - 7 - sulfonic acid, 1-amino-8-hydroxynaphthalene - 6 - sulfonic acid, 2-amino-5-hydroxynaphthalene - 7 - sulfonic acid, 2-amino-8-hydroxynaphthalene-6 - sulfonic acid, 1 - amino-8-hydroxynaphthalene-3,6- or 4,6 - disulfonic acid, or 2-amino-8-hydroxynaphthalene - 3,6 - disulfonic acid or 2-amino-5-hydroxynaphthalene-1,7-disulfonic acid. The following aromatic amines are suitable, for example, as coupling components: 1-methyl - 2-methoxy-4-aminobenzene, 1-chloro-2-methoxy-4 - aminobenzene, or (2 - methyl-5-amino-phenoxy)-acetic acid, 1 - aminonaphthalene - 4 - sulfonic acid, 1-aminonaphthalene-4,6-, -4,7- or -4,8- disulfonic acid, 2-aminonaphthalene, 2-aminonaphthalene -5-, -6- or -7-sulfonic acid, 2-aminonaphthalene-3,6- or -5,7- disulfonic acid, 5-aminoacenaphthalene or 6-amino-acenaphthalene-3- or -4- sulfonic acid.

Coupling components falling under Formula II correspond to formula

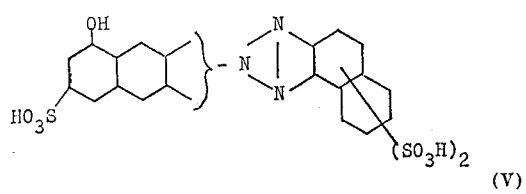

(V)

are used particularly for the production of the dyestuffs of Formula IA. They are obtained by oxidizing the o-aminoazo dyestuffs which are produced from the diazonium compound of 2-amino-5-hydroxynaphthalene-7-sulfonic acid or 2-amino-8-hydroxynaphthalene-6-sulfonic acid and an aminonaphthalene disulfonic acid coupling in a position adjacent to the amino group.

The diazotised amine of Formula I is coupled with the coupling component of Formula II preferably in a weakly alkaline medium, if desired, in the presence of tertiary nitrogen base which accelerates the reaction, e.g., pyridine or β-picoline.

A modification of the process according to the invention for the production of reactive monoazo dyestuffs consists in oxidizing a disazo dyestuff of formula

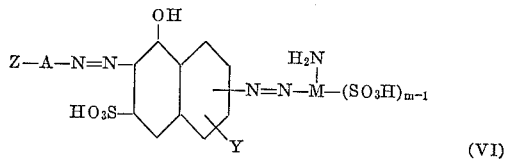

wherein A, Y, Z, M and m have the meanings defined in Formulas I and II and in which the amino group is in o-position to the azo bond, to form the corresponding triazole compound.

Disazo dyestuffs of Formula VI are obtained, for example, by coupling the diazonium compound of an amine of Formula I with an amino-1-hydroxynaphthalene-3-sulfonic acid, diazotizing the amino-monoazo dyestuff obtained and coupling the diazo compound so obtained with an optionally sulfonated aromatic amine coupling in a position adjacent to the amino group. However, the amino-1-hydroxynaphthalene-3-sulfonic acid can also first be diazotised and combined with the aromatic amine coupling in an o-position to the amino group to form the o-aminoazo dyestuff and then this can be treated with the diazonium compound of the amine of Formula I.

Starting materials suitable for this method of performing the process according to the invention are given in the description of the first process. The remarks made in the description of the first process regarding the oxidation of the disazo dyestuff of Formula VI to the triazole compound of Formula III are also valid here.

A further modification of the process according to the invention for the production of reactive monoazo dyestuffs of Formula III in which Z is bound to A by way of an amino group consists in reacting an aminoazo dyestuff of formula

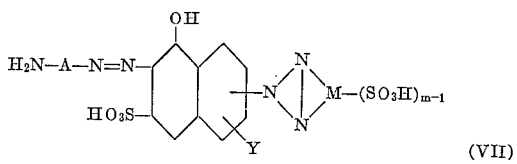

wherein A, Y, M and m have the meanings defined in Formulas I and II and also the other conditions are valid, with an agent introducing the reactive radical Z.

Azo dyestuffs of Formula VII are obtained, for example, by coupling the diazonium compound of an optionally sulfonated amine of the benzene series which contains a substituent which can be converted into an amino group, e.g. a nitro group or acetylamino group, with a coupling component of Formula II and then reducing the nitro group to the amino group or saponifying the acetylamino group to the amino group. Suitable diazo components are e.g. 1-amino-3-acetylaminobenzene-6-sulfonic acid, 1-amino-4-acetylamino-benzene-6-sulfonic acid, 1-amino-3-nitrobenzene-6-sulfonic acid or 1-amino-4-nitro-6-sulfonic acid.

The halides of the carboxylic and sulfonic acids mentioned in the discussion of Z and, mainly, halogen triazines and diazines having more than one mobile halogen atom are used as agents introducing the radical Z.

The aminoazo dyestuff of Formula VII is reacted with the agent introducing the radical Z in the usual manner, advantageously in aqueous medium, if desired in the presence of inert organic solvents which can easily be removed such as low aliphatic ketones, e.g. acetone, and preferably in the presence of mineral acid buffering agents such as sodium carbonate or potassium carbonate, sodium hydroxide or potassium hydroxide, di- or tri- sodium phosphate or di- or tri-potassium phosphate, sodium acetate or potassium acetate or tertiary nitrogen bases such as pyridine.

After dyeing the cellulose material at a low temperature in the dyebath described hereinbefore, the dyestuff is then fixed by treatment with acid binding agents. As such can be used, for example, sodium carbonate, potassium carbonate, di- and tri- sodium phosphate, sodium hydroxide and, at temperatures of over 50° C., also potassium bicarbonate or sodium bicarbonate. The fixing treatment with these agents can be performed at room temperature or at a raised temperature. Instead of subjecting the impregnated materials to an alkaline aftertreatment, in many cases the acid binding agent can also be added to the dyebath, whereupon the dyeing is developed by a short heating to temperatures over 100° C. up to 160° C. or by storing for a longer time at room temperature.

The following non-limitative examples serve to illustrate the invention further.

Where not otherwise stated, parts and percentages are given by weight. The temperatures are in degrees centigrade. The relationship of parts by weight to parts by volume is as that of milliliters (ml.) to grams (g.)

*Example 1*

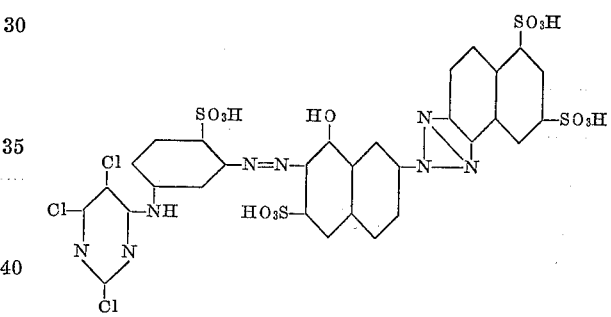

37.0 parts of 1-amino-3[2',5',6'-trichloropyrimidyl-(4') amino]-benzene-6-sulphonic acid are dissolved with a neutral reaction in 500 parts of water. First 6.9 parts of sodium nitrite and then 25 parts of hydrochloric acid are added at 10–15° and the whole is stirred for 1 hour at 10–15°. A triazole compound is produced by coupling diazotised 2-amino-8-hydroxynaphthalene-6-sulphonic acid and 2-aminonaphthalene-5,7-disulphonic acid and then oxidising with a copper-II salt. The yellow diazonium suspension is poured within 15 minutes at 30–35° into a solution of 55.1 parts of this triazole compound and 25 parts of sodium bicarbonate in 750 parts of water. The coupling is complete after stirring for two hours. The new dyestuff is precipitated with sodium chloride, filtered off, washed with dilute sodium chloride solution, and dried in vacuo at 60–70°. It is a dark red powder which dissolves in water with a scarlet colour. 20 parts of the new dyestuff are dissolved in 1000 parts of water and 20 parts of sodium carbonate are added. 100 parts of cotton are introduced at 40°, the bath is heated to 90–95° within 30 minutes, 80 parts of sodium chloride are added and dyeing is performed for 1 hour at this temperature. The goods are then rinsed and soaped at the boil for 15 minutes. A level, scarlet dyeing is obtained which has very good fastness to light, chlorine, and wet.

Dyestuffs having similar properties are obtained if, in the above example, instead of the 37 parts of 1-amino-3-[2',5',6'-trichloropyrimidyl-(4')-amino]-benzene-6- sulphonic acid and instead of the 55.1 parts of the coupling component, a corresponding number of parts of the diazo and coupling components given in the following Table I are used and the conditions given in the above example are maintained.

TABLE I

| Dyestuff No. | Diazo component | Coupling component | Shade on cellulose fibres |
|---|---|---|---|
| 1a | 1-amino-3-[2',5',6'-tri-chloropyrimidyl-(4')-amino]-benzene-6-sulphonic acid. | 2-amino-8-hydroxynaphthalene-6-sulphonic acid→1-amino-naphthalene-4,6-disulphonic acid, oxidised. | Scarlet. |
| 2 | ____do____ | 2-amino-5-hydroxynaphthalene-7-sulphonic acid→1-amino-naphthalene-4,8-disulphonic acid, oxidised. | Do. |
| 3 | ____do____ | 2-amino-5-hydroxynaphthalene-7-sulphonic acid→2-amino-naphthalene-6-sulphonic acid, oxidised. | Do. |
| 4 | ____do____ | 1-amino-5-hydroxynaphthalene-7-sulphonic acid→2-amino-naphthalene-5,7-disulphonic acid, oxidised. | Do. |
| 5 | 1-amino-3-[2',6'-dichloro-pyrimidyl-(4')-amino]-benzene-6-sulphonic acid. | 2-amino-8-hydroxynaphthalene-3,6-disulphonic acid→2-aminonaphthalene-5,7-disulphonic acid, oxidised. | Do. |
| 6 | 1-amino-3-[4',6'-dichloro-1',3',5'-triazinyl-(2')-amino]-benzene-6-sulphonic acid. | 1-amino-8-hydroxynaphthalene-3,6-disulphonic acid→2-aminonaphthalene, oxidised. | Do. |
| 7 | 1-amino-3-[4'-amino-6'-chloro-1',3',5'-triazinyl-(2')-amino]-benzene-6-sulphonic acid. | ____do____ | Do. |
| 8 | 1-amino-3-[4'-methoxy-6'-chloro-1',3',5'-triazinyl-(2')amino]-benzene-6-sulphonic acid. | 2-amino-8-hydroxynaphthalene-4,6-disulphonic acid→2-aminonaphthalene, oxidised. | Do. |
| 9 | 1-amino-3-[4'-(3"-sulphophenylamino)-6'-chloro-1',3',5'-triazinyl-(2')-amino]-benezene-6-sulphonic acid. | 2-amino-8-hydroxynaphthalene-6-sulphonic acid→2-aminonaphthalene-6-sulphonic acid, oxidised. | Do. |
| 10 | 1-amino-3-(β-chlorocrotonyl-amino)-benzene-6-sulfonic acid. | 2-amino-5-hydroxynaphthalene-7-sulfonic acid→2-amino-naphthalene-7-sulfonic acid, oxidised. | Do. |
| 11 | 1-amino-4-(β-chloropropionylamino)-benzene-6-sulfonic acid. | 2-amino-8-hydroxynaphthalene-6-sulfonic acid→2-amino-naphthalene-3,6-disulfonic acid, oxidised. | Bordeaux. |
| 12 | 1-amino-4-(β-chloroacrylamino)-benzene-6-sulfonic acid. | ____do____ | Do. |
| 13 | 1-amino-4-[2',5',6'-trichloropyrimidyl-(4')-amino]-benzene-6-sulfonic acid. | 2-amino-8-hydroxynaphthalene-3,6-disulfonic acid→2-aminonaphthalene-6-sulfonic acid, oxidised | Violet. |
| 14 | 1-amino-3-[3'-nitro-4'-fluorobenzoyl-amino]-benzene-6-sulfonic acid. | 2-amino-5-hydroxynaphthalene-7-sulfonic acid→2-amino-5,7-disulfonic acid, oxidised. | Scarlet. |
| 15 | 1-amino-2-methyl-3-[2',6'dibromo-pyrimidyl-(4')-amino]-benzene-5-sulfonic acid. | ____do____ | Do. |
| 16 | 1-amino-3-[2',5',6'-trichloropyrimidyl-(4')-amino]-6-methylbenzene. | 2-amino-8-hydroxynaphthalene-3,6-disulfonic acid→2-aminonaphthalene-3,6-disulfonic acid, oxidised. | Do. |
| 17 | 1-amino-3-[2',5',6'-trichloropyrimidyl-(4')-amino]-benzene-6-sulfonic acid. | 2-amino-5-hydroxynaphthalene-7-sulfonic acid→6-amino-acenaphthene-4-sulfonic acid, oxidised. | Do. |
| 18 | 1-amino-3-[2',5',6'-trichloropyrimidyl-(4')-amino]-benzene-6-sulfonic acid. | 2-amino-5-hydroxynaphthalene-7-sulfonic acid→2-methyox-4-aminobenzene-1-sulfonic acid oxidised. | Do. |
| 19 | 1-amino-4-[4'-amino-6'-chloro-1',3',5'-triazinyl-(2')-amino]-benzene-6-sulfonic acid. | 2-amino-5-hydroxynaphthalene-1,7-disulfonic acid→1-methyl-2-methoxy-4-aminobentene, oxidised. | Red-violet. |
| 20 | 1-amino-3-[4'-(2"-sulfophenylamino-6'-chloro-1,3',5'-trizainyl-(2')-amino]-benzene-6-sulfonic acid. | 1-amino-8-hydroxynaphthalene-4,6-disulfonic acid→1-chloro-2-methoxy-4-aminobenzene, oxidised. | Scarlet. |
| 21 | 1-amino-3-[2',5',6'-tribromopyrimdiyl-(4')-amino]-6-methylsulfonylbenzene. | 1-amino-8-hydroxynaphthalene-3,6-disulfonic acid→2-amino-naphthalene-6-sulfonic acid, oxidised. | Do. |
| 22 | 1-amino-3-[2',5',6'-trichloropyrimidyl-(4')-amino]-6-ethylsulfonyl-benzene. | ____do____ | Do. |
| 23 | 1-amino-3-[2',5',6'-trichloropyrimidyl-(4')-N-methylamino]-benzene-6-sulfonic acid. | 1-amino-5-hydroxynaphthalene-7-sulfonic acid→2-aminonaphthalene-5,7-disulfonic acid, oxidised. | Do. |
| 24 | 1-amino-3-[2',3'-dichloro-quinoxalino-6'-carboxylamino-benzene-6-sulfonic acid. | 2-amino-8-hydroxynaphthalene-6-sulfonic acid→2-aminonaphthalene-5,7-disulfonic acid, oxidised. | Do. |

*Example 25*

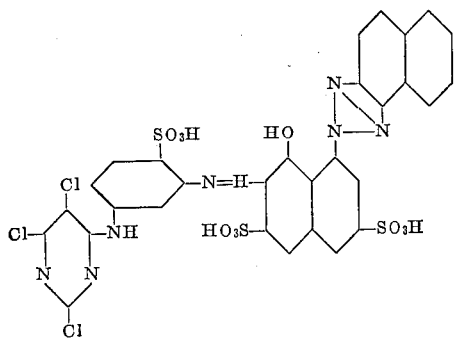

85.3 parts of the reactive disazo dyestuff, obtained by by coupling diazotised 1-amino-3-[2',5',6'-trichloropyrimidyl-(4')-amino]-benzene-6-sulphonic acid with 1-amino-8-hydroxynaphthalene-3,6-disulphonic acid in an alkaline medium, further diazotising the aminomonoazo dyestuff obtained and coupling it with 2-aminonaphthalene in a weakly acid solution, are dissolved in 1000 parts of water at 85–90° and pH of 4.5–5.0. 60 parts of crystallised sodium acetate are added and then 55 parts of crystallised copper sulphate are added within 1 hour at 80–90°. The disazo dyestuff is oxidised to the triazole compound after 3–4 hours. The new dyestuff is precipitated with sodium chloride, filtered off and washed with dilute sodium chloride solution. The dry dyestuff is a dark red powder which dissolves in water with a red colour.

If cotton is impregnated at 20° with a 2% solution of the dyestuff, which solution also contains 5% of urea and 2% of sodium carbonate, then steamed for 5 to 10 minutes at 100–110°, rinsed and soaped at the boil, then a yellowish red dyeing is obtained which has good fastness to light and very good wet fastness properties.

If, instead of the disazo dyestuff described in the above example, a corresponding number of parts of the disazo dyestuffs given in the following Table II are used and these are oxidized under the conditions given in the example, then dyestuffs having similarly good properties are attained.

TABLE II

| Dyestuff No. | Disazo dyestuff | Shade on cellulose fibers |
| --- | --- | --- |
| 26 | 1-amino-3-[2',5',6'-trichloropyrimidyl-(4')-amino]-benzene-6-sulfonic acid→2-amino-8-hydroxynaphthalene-6-sulfonic acid→2-aminonaphthalene-3,6-disulfonic acid. | Scarlet. |
| 27 | 1-amino-3-[2',6'-dichloropyrimidyl-(4')-amino]-benzene-6-sulfonic acid→2-amino-5-hydroxynaphthalene-7-sulfonic acid→1-aminonaphthalene-4,6-disulfonic acid. | Do. |
| 28 | 1-amino-3-[4'-methylamino-6'-chloro-1',3',5'-triazinyl-(2')-amino]-benzene-6-sulfonic acid→2-amino-5-hydroxynaphthalene-1,7-disulfonic acid→1-methyl-2-methoxy-4-amino-benzene. | Do. |
| 29 | 1-amino-4-[4'-ethoxy-6'-chloro-1',3',5'-triazinyl-(2')-amino]-benzene-6-sulfonic acid→1-amino-8-hydroxynaphthalene-3,6-disulfonic acid→5-amino-acenaphthene. | Red-violet. |
| 30 | 1-amino-4-[2',5',6'-trichloropyrimidyl-(4')-amino]-benzene-6-sulfonic acid→2-amino-8-hydroxynaphthalene-3,6-di-sulfonic acid→6-amino-acenaphthene-3-sulfonic acid. | Do. |
| 31 | 1-amino-3-[2',6'-dichloropyrimidyl-(4')-amino]-benzene-6-sulfonic acid→1-amino-8-hydroxynaphthalene-6-sulfonic acid→1-aminonaphthalene-4,7-disulfonic acid. | Scarlet. |
| 32 | 1-amino-3-[2',5',6'-trichloropyrimidyl-(4')-amino]-benzene-6-sulfonic acid→1-amino-8-hydroxynaphthalene-4,6-disulfonic acid→2-aminonaphthalene-5-sulfonic acid. | Do. |
| 33 | 1-amino-3-[2',5',6'-trichloropyrimidyl-(4')-amino]-benzene-6-sulfonic acid→1-amino-8-hydroxynaphthalene-3,6-di-sulfonic acid→1-chloro-2-methoxy-4-amino-benzene. | Do. |
| 34 | 1-amino-4-[4'-(2''-sulfophenylamino)-6'-chloro-1',3',5'-triazinyl-(2')-amino]-benzene-6-sulfonic acid→2-amino-5-hydroxynaphthalene-1,7-disulfonic acid→2-methyl-5-amino-phenoxy-acetic acid. | Red-violet. |

*Example 35*

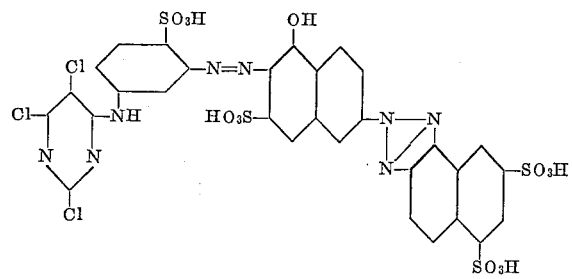

The triazole compound is produced in the usual way from 2-amino-5-hydroxynaphthalene-7-sulphonic acid and 2-aminonaphthalene-5,7-disulphonic acid. 75.0 parts of the aminomonoazo dyestuff, produced by coupling diazotised 1-amino-3-acetylaminobenzene-6-sulphonic acid with this triazole compound and then saponifying the acetylamino group with dilute sodium hydroxide solution, are dissolved in 1000 parts of water at 60–65°. 24.0 parts of 2,4,5,6-tetrachloropyrimidine are added to this neutral solution within 1 hour, care being taken by simultaneous addition dropwise of sodium carbonate solution that the pH of the reaction mixture remains constant. As soon as no more free amino groups can be traced, the dyestuff is precipitated with sodium chloride, filtered off and washed with dilute sodium chloride solution. The dyestuff is dried in vacuo at 60–70° and is then a red powder which dissolves in water with a yellowish scarlet colour.

The brilliant scarlet dyeing attained therewith by the method described in the second paragraph of Example 1 has excellent fastness to light, chlorine and wet.

Similarly good dyestuffs are obtained if, in the above example, instead of the 75.0 parts of the aminomonoazo dyestuff mentioned, a corresponding number of parts of the aminomonoazo dyestus given in the following Table III are reacted with the acylating agents given in column 3 of the same table under corresponding conditions.

TABLE III

| Dyestuff No. | Aminomonoazo dyestuffs | Acylating agents | Shade on cellulose fibers |
| --- | --- | --- | --- |
| 36 | 1-amino-3-acetylaminobenzene-6-sulfonic acid → [2-amino-5-hydroxynaphthalene-7-sulfonic acid → 2-aminonaphthalene-3,6-disulfonic acid, oxidized], saponified. | 2,4,5,6-tetrachloro-pyrimidine. | Scarlet. |
| 37 | 1-amino-3-acetylaminobenzene-6-sulfonic acid → [2-amino-8-hydroxynaphthalene-6-sulfonic acid → 2-aminonaphthalene-6-sulfonic acid, oxidized], saponified. | do | Do. |
| 38 | 1-amino-4-acetylaminobenzene-6-sulfonic acid → [2-amino-8-hydroxynaphthalene-3,6-disulfonic acid → 2-aminonaphthalene, oxidized], saponified. | 2,4,6-trichloropyrimidine | Violet. |
| 39 | do | 2,4,6-trichloro-1,3,5-triazine | Do. |
| 40 | do | β-Chlorocrotonic acid chloride. | Do. |
| 41 | 1-amino-3-acetylaminobenzene-6-sulfonic acid → [1-amino-8-hydroxynaphthalene-3,6-disulfonic acid → 1-aminonaphthalene-4-sulfonic acid, oxidized], saponified. | do | Scarlet. |
| 42 | 1-amino-3-acetylaminobenzene-6-sulfonic acid → [1-amino-8-hydroxynaphthalene-3,6-disulfonic acid → 1-aminonaphthalene-4-sulfonic acid, oxidised], saponified. | 3-nitro-4-fluorobenzoyl chloride. | Scarlet. |
| 43 | 1-amino-3-nitrobenzene-6-sulfonic acid → [2-amino-5-hydroxynaphthalene 7-sulfonic acid → 1-aminonaphthalene-4,8-disulfonic acid, oxidized], reduced. | β-Bromo propionic acid chloride. | Do. |
| 44 | do | β-Chloroacrylic acid chloride. | Do. |
| 45 | 1-amino-3-nitrobenzene-6-sulfonic acid → [2-amino-5-hyroxynaphthalene-1,7-disulfonic acid → 2-aminonaphthalene-5-sulfonic acid, oxidized] → 2-amino-naphthalene-5-sulfonic acid, oxidized], reduced. | 2,4,5,6-tetrachloropyrimidine. | Do. |
| 46 | 1-amino-3-nitrobenzene-6-sulfonic acid → [2-amino-8-hydroxynaphthalene-6-sulfonic acid → 1-aminonaphthalene-4,7-disulfonic acid, oxidised], reduced. | 2,4,6-trichloro-1,3,5-triazine | Do. |
| 47 | 1-amino-3-nitrobenzene-6-sulfonic acid → [2-amino-5-hydroxynaphthalene 7-sulfonic acid → 2 aminonaphthalene - 5,7 - disulfonic acid, oxidised], reduced. | 2,3-dichloroquinoxaline-6-carboxylic acid chloride. | Scarlet. |

We claim:
1. A dyestuff of the formula

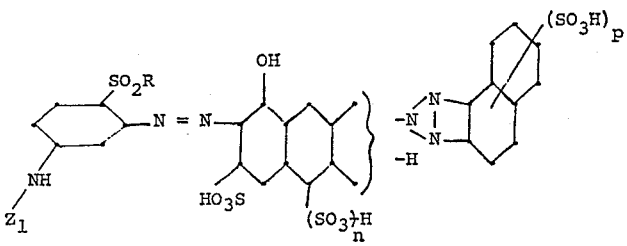

wherein
- $n$ is one of the integers 0 and 1,
- $p$ is an integer ranging from 0 to 3, the sum of $n+p$ ranging from 1 to 3,
- R is a member selected from the group consisting of hydroxy and lower alkyl, and
- $Z_1$ is a fiber-reactive dyestuff substituent containing at least one mobile halogen atom of an atomic number ranging from 9 to 35.

2. A dyestuff of the formula

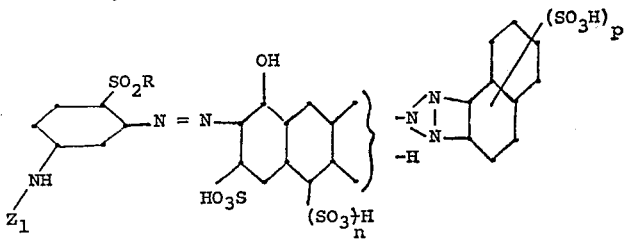

wherein
- $n$ is one of the integers 0 and 1,
- $p$ is an integer ranging from 0 to 3, the sum of $n+p$ ranging from 1 to 3,
- R is a member selected from the group consisting of hydroxy and lower alkyl, and
- $Z_1$ is triazinyl containing at least one mobile halogen atom, the remaining carbon bonds of the triazinyl nucleus bearing members selected from the group consisting of H, halogen, lower alkoxy, lower alkylthio, phenoxy, phenylthio, $NH_2$, —NHR' and NR'R'', R' being a member selected from the group consisting of lower alkyl, hydroxy-lower alkyl, cyano-lower alkyl, phenyl, sulfo-phenyl and lower alkyl-phenyl, and R'' being selected from the group consisting of lower alkyl and hydroxy-lower alkyl.

3. A dyestuff of the formula

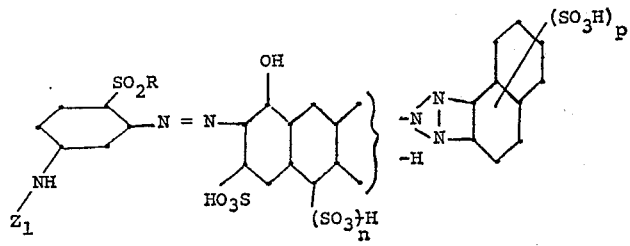

wherein
- $n$ is one of the integers 0 and 1,
- $p$ is an integer ranging from 0 to 3, the sum of $n+p$ ranging from 1 to 3,
- R is a member selected from the group consisting of hydroxy and lower alkyl, and
- $Z_1$ is pyrimidyl containing at least one mobile halogen atom, the remaining carbon bonds of the pyrimidyl nucleus bearing members selected from the group consisting of H, halogen, lower alkoxy, lower alkylthio, phenoxy, phenylthio, $NH_2$, —NHR' and and NR'R'', R' being a member selected from the group consisting of lower alkyl, hydroxy-lower alkyl, cyano-lower alkyl, phenyl, sulfophenyl and lower alkyl-phenyl, and R'' being selected from the group consisting of lower alkyl and hydroxy-lower alkyl.

4. A dyestuff according to claim 3, wherein $Z_1$ is dibromo-pyrimidyl.
5. A dyestuff according to claim 3, wherein $Z_1$ is tribromo-pyrimidyl.
6. A dyestuff according to claim 3, wherein $Z_1$ is dichloro-pyrimidyl.
7. A dyestuff according to claim 3, wherein $Z_1$ is trichloro-pyrimidyl.
8. A compound of the formula

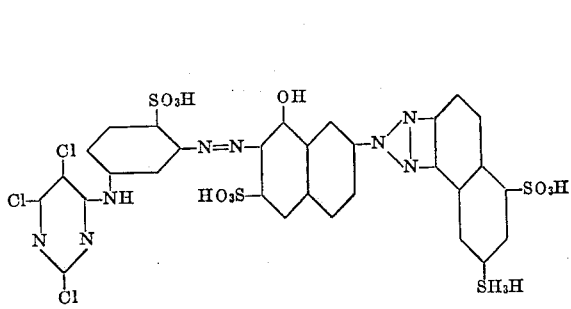

9. A compound of the formula

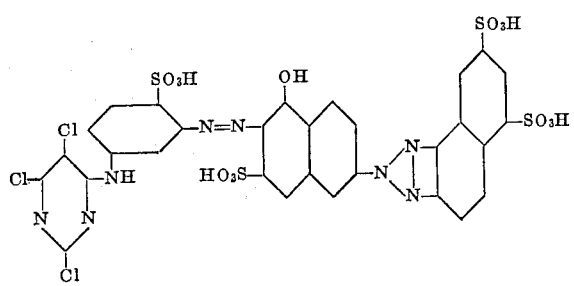

10. A compound of the formula
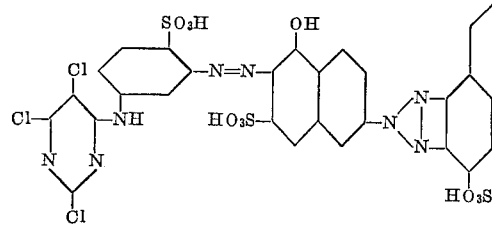
11. A compound of the formula
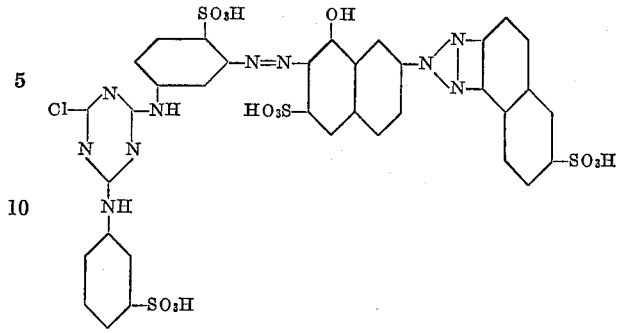
No references cited.
CHARLES B. PARKER, *Primary Examiner.*
FLOYD D. HIGEL, *Assistant Examiner.*